(12) United States Patent
Kusama et al.

(10) Patent No.: US 6,969,016 B2
(45) Date of Patent: Nov. 29, 2005

(54) DAMPENING WATER SPRAYING DEVICE

(75) Inventors: Seiichi Kusama, Kawasaki (JP); Yoshimaro Shiba, Tokyo (JP)

(73) Assignee: Kabushikikaisha Tokyo Kikai Seisakusho, Tokyo ( * ) Notice: Subject to any disclaimer, the term of this patent is extended or adjusted under 35 U.S.C. 154(b) by 122 days.

(21) Appl. No.: 10/461,881

(22) Filed: Jun. 16, 2003

(65) Prior Publication Data
US 2004/0016827 A1    Jan. 29, 2004

(30) Foreign Application Priority Data
Jul. 29, 2002    (JP)    ............................... 2002-219069

(51) Int. Cl.[7] ................................................ B05B 1/00
(52) U.S. Cl. ...................... 239/600; 239/550; 285/376; 285/402; 285/404
(58) Field of Search ................................ 239/600, 544, 239/545, 548, 550; 101/147, 148, 132.5; 285/360, 373, 376, 314, 402, 404

(56) References Cited

U.S. PATENT DOCUMENTS

| | | | |
|---|---|---|---|
| 4,128,206 A | * | 12/1978 | Bintner ......................... 239/11 |
| RE30,486 E | | 1/1981 | Beck |
| 4,527,745 A | * | 7/1985 | Butterfield et al. ......... 239/600 |
| 4,873,925 A | | 10/1989 | Hultberg et al. |
| 5,421,522 A | * | 6/1995 | Bowen ........................ 239/600 |
| 5,564,448 A | * | 10/1996 | Lincoln .................. 134/166 R |
| 5,836,397 A | * | 11/1998 | Craig et al. ..................... 169/5 |

FOREIGN PATENT DOCUMENTS

| | | |
|---|---|---|
| EP | 0 279 992 A2 | 8/1988 |
| JP | 56-262 | 6/1954 |
| JP | 59-26166 | 2/1984 |
| JP | 62-61310 | 4/1987 |
| JP | 02-6863 | 1/1990 |
| JP | 30-35371 B | 12/1992 |
| JP | 3035371 B2 | 8/2000 |

* cited by examiner

*Primary Examiner*—Dinh Q. Nguyen
(74) *Attorney, Agent, or Firm*—Morgan, Lewis & Bockius LLP

(57) ABSTRACT

A dampening water spraying device includes:
  a nozzle for spraying dampening water;
  a nozzle holder including, an end surface connectable to the nozzle, and an outer peripheral portion provided with at least one groove; and
  a nozzle fixing member including, an opening portion adapted to expose at least a spout of the nozzle, and an inner peripheral portion provided with a nozzle attachment/detachment moving portion opposed to and engageable with the groove, the nozzle fixing member being adapted to be fastened to the nozzle holder while clamping the nozzle between the nozzle fixing member and the nozzle holder;
wherein the nozzle fixing member includes an outer peripheral portion provided with a handhold portion for making it possible to to manually rotate the nozzle fixing member, thereby allowing to rapidly and readily conduct replacement of the nozzle.

11 Claims, 9 Drawing Sheets

DAMPENING WATER SPRAYING DEVICE

BACKGROUND OF THE INVENTION

1. Field of the Invention

The present invention relates to a dampening arrangement in an offset press, and particularly to a dampening water spraying device provided in such an arrangement and including a removable nozzle.

2. Description of the Prior Art

Generally, offset presses are provided with dampening arrangement for supplying dampening water prepared with various additives onto printing plate surfaces or onto peripheral surfaces of rollers leading to the printing plates, and particularly, printing machines in off-set newspaper presses (hereinafter simply called "newspaper presses") are often provided with dampening arrangement. Dampening water spraying devices (hereinafter simply called "spraying devices") to be used in the dampening arrangement mainly include those of a so-called single fluid type wherein pressurized dampening water is pushed out and sprayed. In such a spraying device, pressurized dampening water is supplied into the spraying device, and the water is alternately stopped and flowed by an operation of an electromagnetic opening/closing valve such that the dampening water is intermittently sprayed from a nozzle attached to a tip end side of the electromagnetic opening/closing valve.

The prior art concerning a nozzle for spraying dampening water to be utilized in the aforementioned spraying device includes that disclosed in Japanese Patent No. 3035371. As shown in FIG. 1 and FIG. 2, the spraying device described in the Japanese Patent No. 3035371 includes: a nozzle $20f$ having an orifice $23f$; a nozzle holder $30f$ for supporting the nozzle; a nozzle fixing member $40f$ in a nut shape for fixing the nozzle to the nozzle holder; and an electromagnetic opening/closing valve $13f$ for alternately stopping and flowing dampening water; such that the dampening water is appropriately sprayed by the operation of the electromagnetic opening/closing valve $13f$. The nozzle $20f$ is to be fixed to the nozzle holder $30f$ by the nozzle fixing member $40f$, and the attachment and detachment of the nozzle $20f$ to and from the nozzle holder $30f$ is to be conducted by a tool. Upon attachment of the nozzle $20f$, the nozzle $20f$ is inserted into the nozzle fixing member $40f$, and the nozzle fixing member $40f$ is threaded by a tool onto a male screw $52f$ provided at the tip end portion of the nozzle holder $30f$, while the nozzle fixing member $40f$ is also loosened by the tool such as when the spray of the dampening water becomes defective.

The spraying device of the prior art disclosed in the Japanese Patent No. 3035371 has such a problem to be solved. Namely, the spraying device of the prior art is intended to spray the dampening water atomized to have a uniform particle diameter from the orifice of the nozzle, by adjusting a supplying pressure of the dampening water so as to improve the printing quality. However, it is extremely difficult to spray the dampening water of a uniform particle diameter from the orifice of the nozzle over a long time, and the orifice is narrowed as the same is used overtime, because the additives contained in the dampening water are deposited and accumulated to a portion around the orifice. It is also inevitable that the orifice is suddenly clogged with foreign matters during long-term usage, thereby changing a spraying state. If this changed state is left alone, the dampening water is not properly sprayed, thereby causing such a serious defect including not only a deteriorated printing quality but also a contaminatedly printed paper face due to lack of the dampening water. As such, it is necessary for a responsible person to replace the nozzle before such a situation, but the working efficiency upon nozzle replacement has been extremely low because attachment and detachment of the nozzle is to be conducted by the tool.

It is also typical in newspaper presses to provide eight pieces of nozzles per one printing cylinder capable of printing a sheet of paper having a 4-page width. However, recent newspapers have been remarkably developed into an increased number of pages and into colorization, and one example of printing by a set of newspaper presses includes a situation for printing a newspaper having 48 pages inclusive of 24 pages to be printed in 4 colors, thereby requiring 48 pieces of nozzles for monochrome printing of 24 pages and requiring 192 pieces of nozzles for color printing of 24 pages, thereby resulting in 240 pieces of nozzles to be used. Usually, newspaper publishers often possess a plurality of sets of newspaper presses, and such an increased number of nozzles far exceeding the aforementioned 240 pieces are to be subjected to maintenance, such that the nozzle maintenance becomes an extremely heavy burden to a responsible person in a position for managing the printing quality.

SUMMARY OF THE INVENTION

It is therefore an object of the present invention to sweepingly solve the problems accompanying the prior art to thereby facilitate the maintenance of nozzles thereby improving working efficiency, by providing a dampening water spraying device capable of rapidly and readily replacing nozzles, in a manner: to fix a nozzle to a nozzle holder by manually rotating a nozzle fixing member in one direction relative to the nozzle holder; and to detach the nozzle from the nozzle holder by manually rotating the nozzle fixing member in the other direction relative to the nozzle holder.

To solve the above problem, the present invention provides a dampening water spraying device for a dampening arrangement for spraying dampening water from a nozzle onto a printing plate surface or onto a peripheral surface of a roller leading to the printing plate, characterized in that the spraying device comprises:

a nozzle for spraying dampening water;

a nozzle holder including, an end surface connectable to the nozzle, and an outer peripheral portion provided with at least one groove; and a nozzle fixing member including, an opening portion adapted to expose at least a spout of the nozzle, and an inner peripheral portion provided with a nozzle attachment/detachment moving portion opposed to and engageable with the groove, the nozzle fixing member being adapted to be fastened to the nozzle holder while clamping the nozzle between the nozzle fixing member and the nozzle holder;

that the nozzle fixing member includes an outer peripheral portion provided with a handhold portion for making it possible to to manually rotate the nozzle fixing member; and that the nozzle fixing member is capable of fixing the nozzle to the nozzle holder by manually rotating the nozzle fixing member in one direction relative to the nozzle holder, and is capable of detaching the nozzle from the nozzle holder by manually rotating the nozzle fixing member in the other direction relative to the nozzle holder.

In claim 2, the present invention further provides a dampening water spraying device for a dampening arrangement for spraying dampening water from a nozzle onto a printing plate surface or onto a peripheral surface of a roller leading to the printing plate, characterized in that the spraying device comprises:

a nozzle for spraying dampening water;

a nozzle holder including, an end surface connectable to the nozzle, and an outer peripheral portion having at least one nozzle attachment/detachment moving portion; and a nozzle fixing member including, an opening portion adapted to expose at least a spout of the nozzle, and an inner peripheral portion provided with a groove opposed to and engageable with the nozzle attachment/detachment moving portion, the nozzle fixing member being adapted to be fastened to the nozzle holder while clamping the nozzle between the nozzle fixing member and the nozzle holder;

that the nozzle fixing member includes an outer peripheral portion provided with a handhold portion for making it possible to to manually rotate the nozzle fixing member; and that the nozzle fixing member is capable of fixing the nozzle to the nozzle holder by manually rotating the nozzle fixing member in one direction relative to the nozzle holder, and is capable of detaching the nozzle from the nozzle holder by manually rotating the nozzle fixing member in the other direction relative to the nozzle holder.

In the dampening water spraying device recited in claim 1, the nozzle attachment/detachment moving portion of the nozzle fixing member interacts with the groove of the nozzle holder, to thereby fix the nozzle to the nozzle holder. In the dampening water spraying device recited in claim 2, the groove of the nozzle fixing member interacts with the nozzle attachment/detachment moving portion of the nozzle holder, to thereby fix the nozzle to the nozzle holder.

Both of the dampening water spraying devices recited in claim 1 and claim 2 allow to readily and manually attach/detach the nozzle without using any mounting tools, thereby contributing to mitigating a work burden of a responsible person.

Further, since the maintenance of nozzles are facilitated by virtue of the mitigated burden of a replacing work, it becomes possible to properly manage and stabilize the spraying state of dampening water, thereby making it possible to to maintain and improve a printing quality.

Preferably, as recited in claim 3, it is desirable for the dampening water spraying device of claim 1 or 2, that the nozzle attachment/detachment moving portion is a protruded body, and that the groove to be engaged with the nozzle attachment/detachment moving portion is a helical groove shorter than the circumference of a peripheral portion to be provided with the helical groove.

Since the nozzle attachment/detachment moving portion is to be engaged with the groove by slightly rotating the nozzle attachment/detachment moving portion, the attachment and detachment of the nozzle can be conducted in a one-touch manner.

Preferably, as recited in claim 4, it is desirable for the dampening water spraying device of claim 1 or 2, that the nozzle attachment/detachment moving portion and the groove to be engaged with the nozzle attachment/detachment moving portion are threaded members, respectively.

This makes it possible to to similarly fix the nozzle fixing member to the nozzle holder, even when the nozzle attachment/detachment moving portion is not a protruded body but a threaded member.

More preferably, as recited in claim 5, it is desirable for the dampening water spraying device of anyone of claims 1 through 4, that the opening portion of the nozzle fixing member has a shape formed to enable the nozzle to pass through the opening portion when the opening portion and the nozzle are placed in a predetermined phase relationship.

Devising the shape of the nozzle fixing member in this way facilitates to detach the nozzle from the nozzle holder.

Further preferably, as recited in claim 6, it is desirable for the dampening water spraying device of anyone of claims 1 through 5, that the nozzle is incorporated in the nozzle fixing member in a manner to be allowed to move relative to the nozzle fixing member, and to be prevented from separating from the nozzle fixing member.

Thus, the nozzle is not inadvertently separated from the nozzle fixing member even when the nozzle fixing member is detached from the nozzle holder.

More preferably, as recited in claim 7, it is desirable for the dampening water spraying device of anyone of claims 1 through 6, that the dampening water spraying device further comprises positioning means capable of fixingly restricting an attached relationship of the nozzle relative to the nozzle holder.

Restricting the attached relationship of the nozzle relative to the nozzle holder realizes an optimum positioning of the nozzle.

Further preferably, as recited in claim 8, it is desirable for the dampening water spraying device of anyone of claims 1 through 7, that the outer peripheral portion of the nozzle holder comprises a cylindrical member provided integrally with the nozzle holder.

Preferably, as recited in claim 9, it is desirable for the dampening water spraying device of anyone of claims 1 through 7, that the inner peripheral portion of the nozzle fixing member comprises a cylindrical member provided integrally with the nozzle fixing member.

By adopting such a cylindrical member, it becomes possible to mitigate a work burden of a responsible person even in the spraying device of the prior art having a screw portion on a nozzle holder, and to facilitate the maintenance of the nozzle.

More preferably, as recited in claim 10, it is desirable for the dampening water spraying device of anyone of claims 1 through 9, that the handhold portion comprises at least one projected portion projected from the outer peripheral portion of the nozzle fixing member.

Since the handhold portion comprises the projected portion, the nozzle can be readily attached and detached without requiring any special tools.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION OF THE PREFERRED EMBODIMENT

There will be explained hereinafter embodiments according to the present invention, with reference to the drawings.

Figure 13:
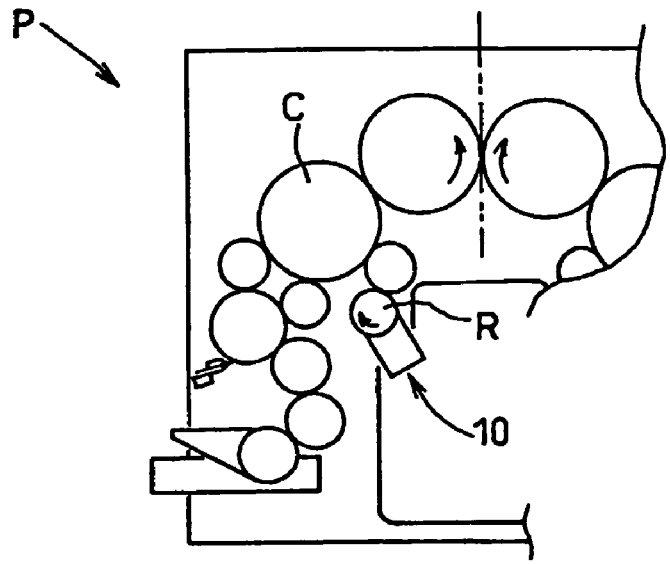
FIG. 13 is a front view of a printing machine showing a layout view of a spraying bar provided with the dampening water spraying device according to the present invention.
Figure 14:
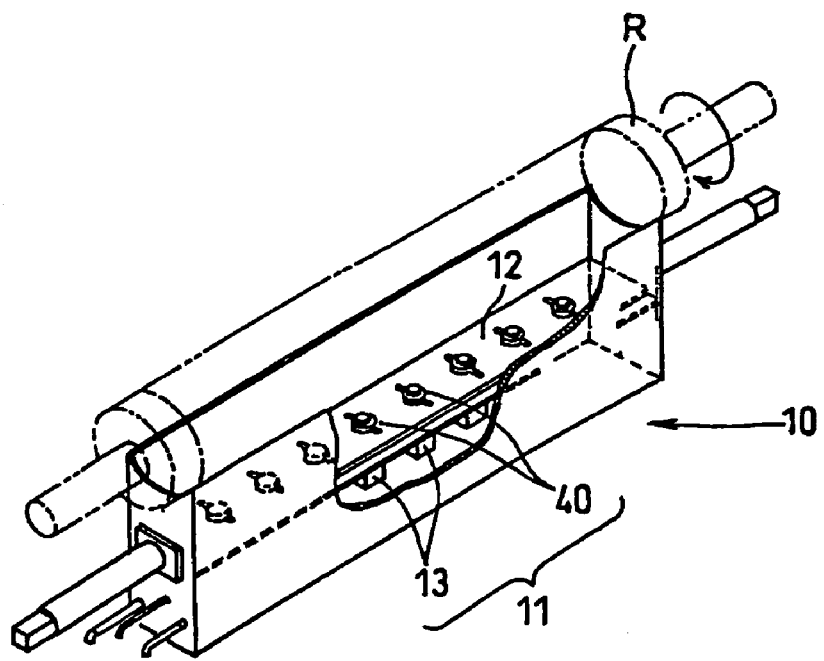
FIG. 14 is a perspective view of the spraying bar in FIG. 13.

The spraying devices according to the present invention are plurally incorporated into a spraying bar 10 of a dampening arrangement provided in a printing machine P (see FIG. 13) of a newspaper press such as an offset press. The spraying bar 10 is provided to oppose to a roller R for supplying dampening water to a plate cylinder C, and the spraying devices 11 are to be mounted on a supporting member 12, typically at 8 points aligned in an axial direction of the plate cylinder C as shown in FIG. 14.

There will be explained hereinafter embodiments of the spraying device 11 (11a, 11b, 11c) according to the present invention.

Figure 3:
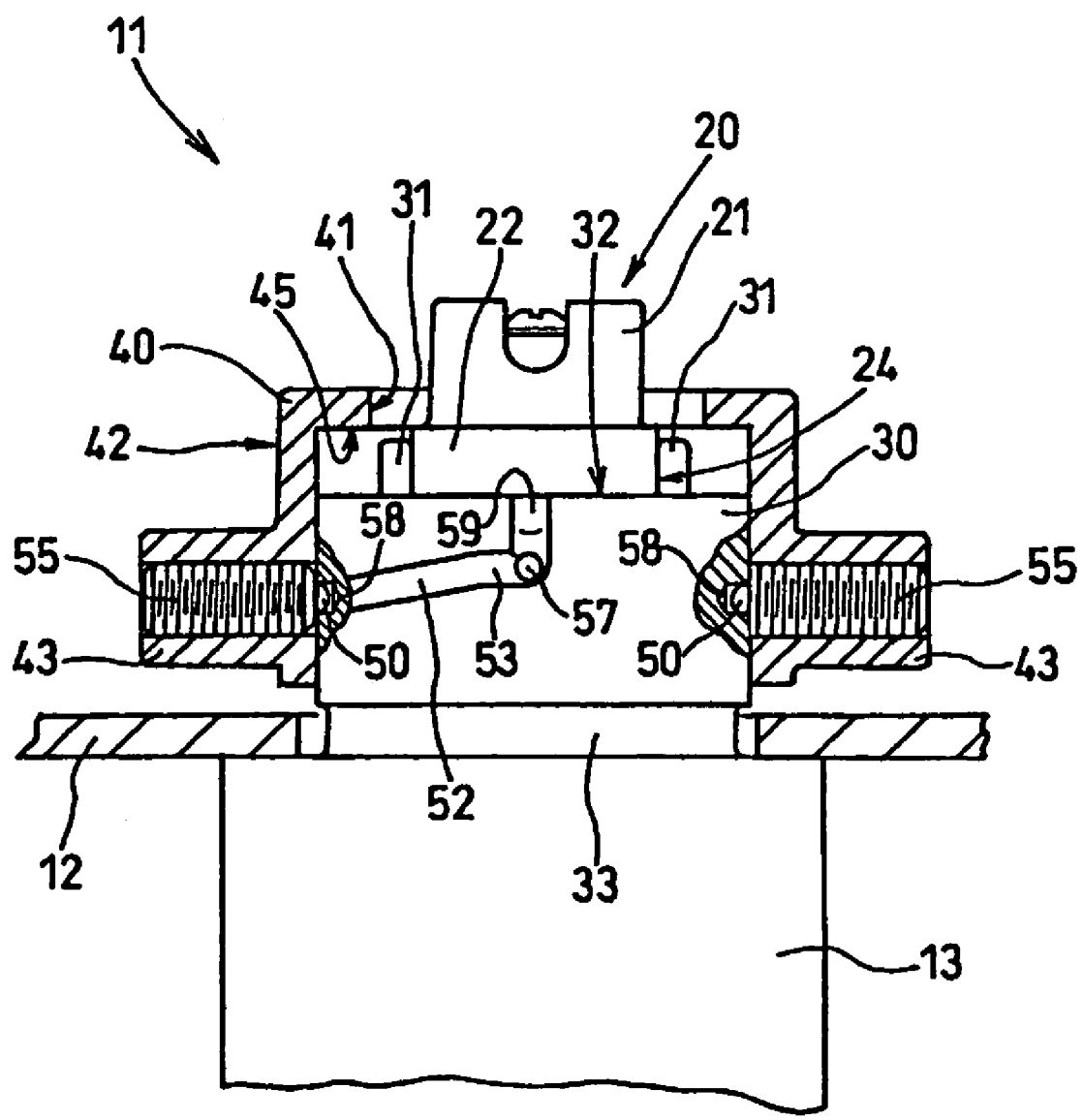
FIG. 3 is a partial cross-sectional view of a dampening water spraying device according to a first embodiment of the present invention.
Figure 4:
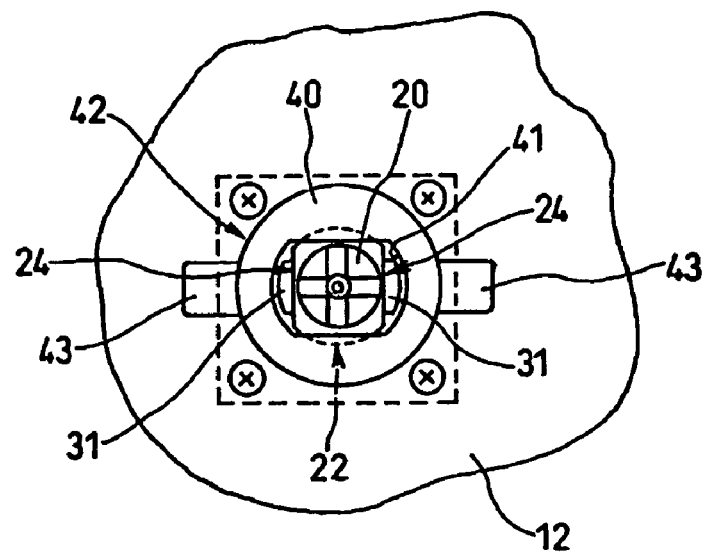
FIG. 4 is a partial plan view of FIG. 3 and FIG. 7.
Figure 5:
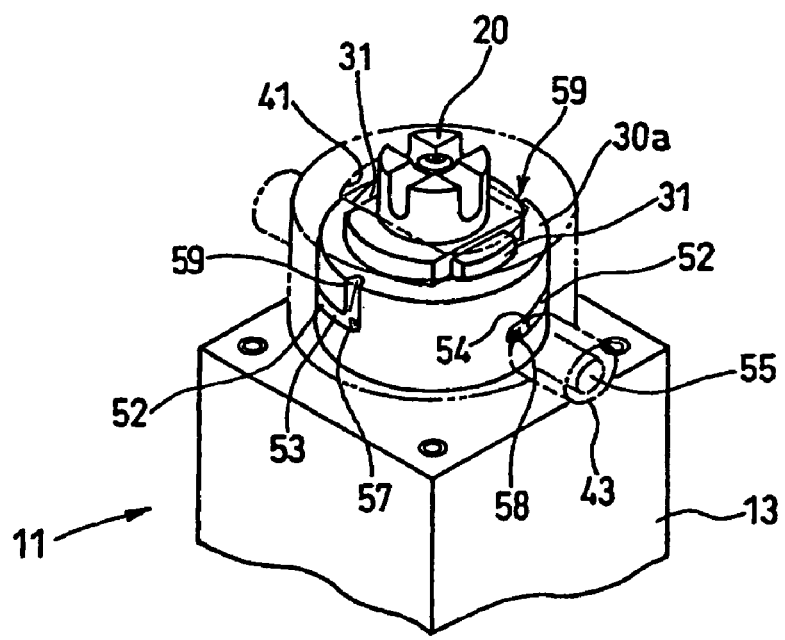
FIG. 5 is a partial perspective view of FIG. 3.
Figure 7:
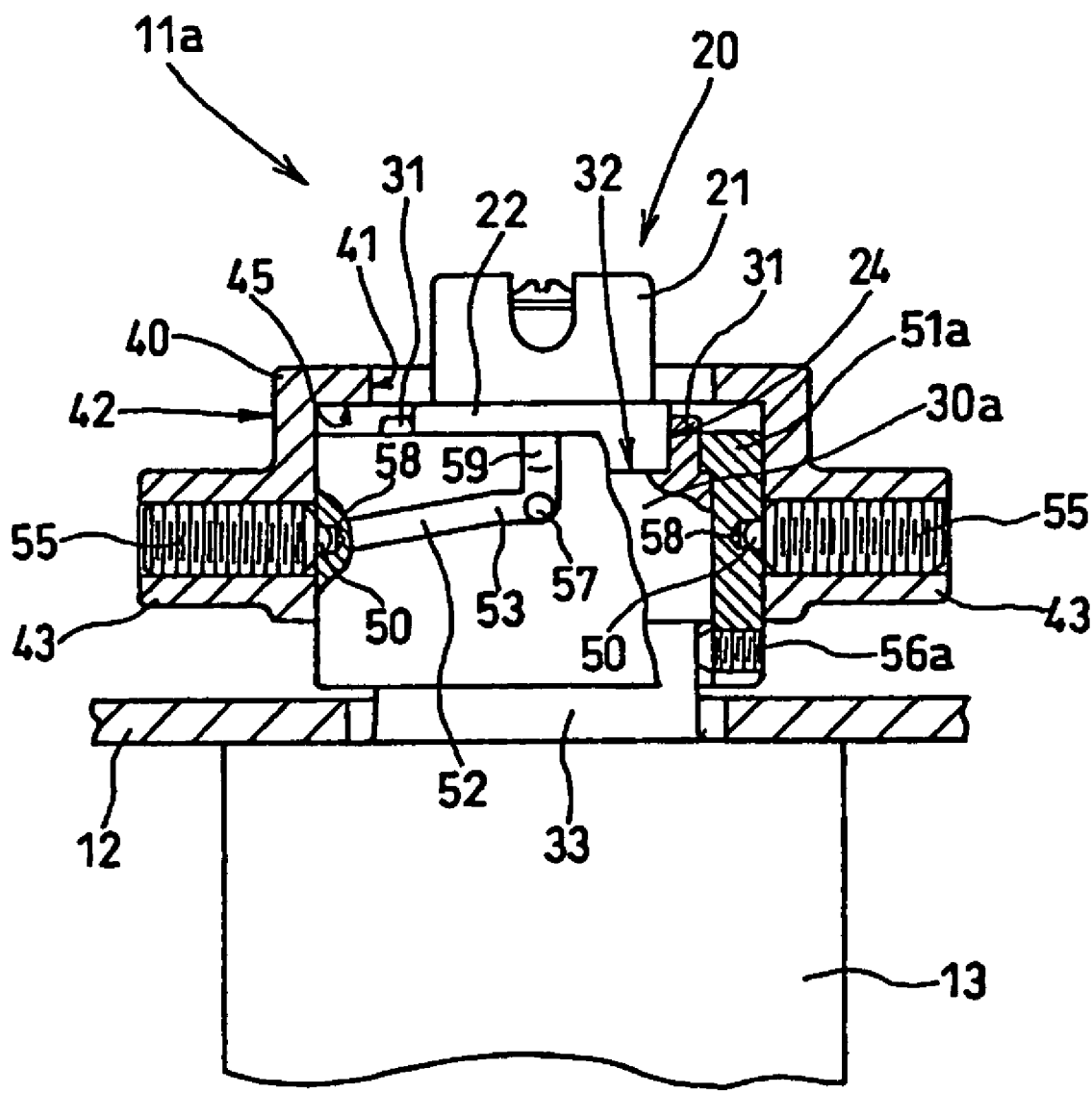
FIG. 7 is a partial cross-sectional view of a dampening water spraying device according to a second embodiment of the present invention.
Figure 8A:
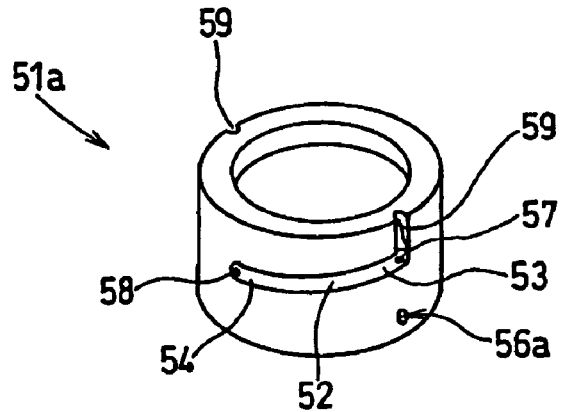
FIG. 8A is a perspective view of a cylindrical member in FIG. 7.
Figure 8B:
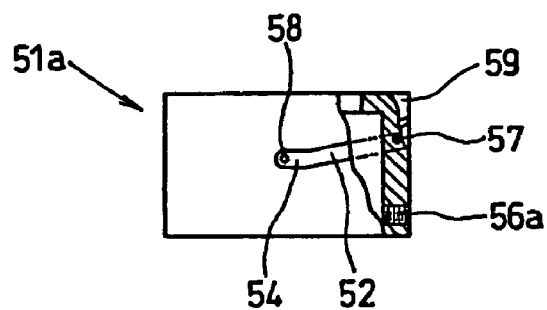
FIG. 8B is a partial cross-sectional view of the cylindrical member of FIG. 8A while showing a vertical groove of the cylindrical member at a right side surface of the latter.
Figure 8C:
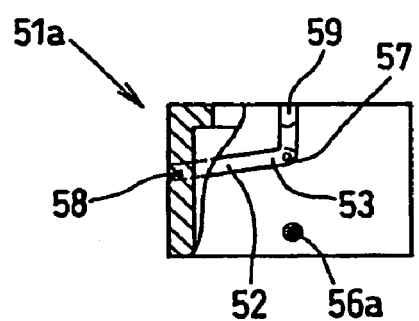
FIG. 8C is a partial cross-sectional view of the cylindrical member of FIG. 8A while showing the vertical groove of the cylindrical member at a frond side of the latter.

The spraying device 11 as the first embodiment of the present invention is shown in FIG. 3, FIG. 4 and FIG. 5. The spraying device 11a as the second embodiment is shown in FIG. 7. Since the sole difference between the first embodiment and second embodiment resides in that the second embodiment has a cylindrical member 51a forming an outer peripheral surface of a nozzle holder 30a, the second embodiment will be explained by simultaneously describing the same in brackets. Note, reference numerals of constituent parts inherent in the second embodiment will be shown in brackets in the following text.

The spraying device 11 (11a) is constituted to include: a nozzle 20 for spraying dampening water; a nozzle holder 30 (30a) integrally attached to one end side of an electromagnetic opening/closing valve 13 and including positioning means 31, 31 for the nozzle 20; a nozzle fixing member 40 for fixing the nozzle 20 to the nozzle holder 30 (30a); and nozzle attachment/detachment moving portions 50 protruded from an inner peripheral portion of the nozzle fixing member 40 in a manner to be opposed to and engaged with two sets of helical grooves 52, 53, 54 and 52, 53, 54 provided on an outer peripheral portion of the nozzle holder 30 (in case of the second embodiment, of the cylindrical member 51a). There will be explained hereinafter the constitutions of the respective portions.

Figure 6A:
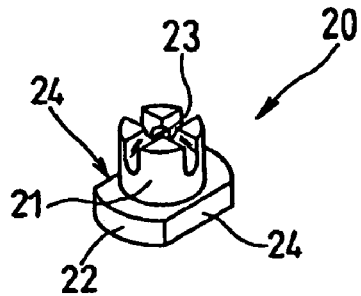
FIG. 6A is a perspective view of a nozzle viewed from an orifice side.
Figure 6B:
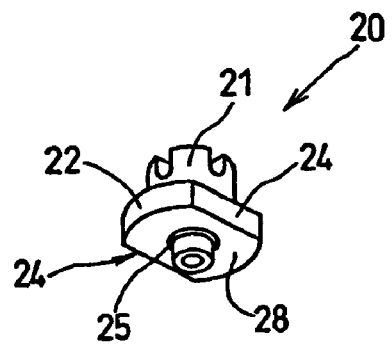
FIG. 6B is a perspective view of a large diameter portion of the nozzle viewed from a bottom surface side.

As shown in FIG. 6A, FIG. 6B, the nozzle 20 includes a small diameter portion 21 and a large diameter portion 22, and the small diameter portion 21 is provided with an orifice 23 for spraying dampening water. The large diameter portion 22 is provided with cut-out surfaces 24, 24 established by partly removing the large diameter portion so as to provide a width larger than the diameter of the small diameter portion 21, and the large diameter portion 22 includes a lower surface 28 provided with an O-ring 25. When the nozzle 20 is attached to the nozzle holder 30 (30a) (see FIG. 3, FIG. 7), the lower surface 28 of the large diameter portion 22 is closely contacted with a connecting portion of an end surface 32 of the nozzle holder 30 by virtue of elastic deformation of the O-ring 25.

As shown in FIG. 3 and FIG. 7, the nozzle holder 30 (30a) includes a neck 33 provided integrally with the electromagnetic opening/closing valve 13. In the second embodiment, the nozzle holder is fitted with the cylindrical member 51a on the outer peripheral portion of the nozzle holder.

The end surface 32 is provided with the positioning means 31, 31 for connecting the nozzle 20 and for determining the phase thereof. The positioning means 31, 31 are protrudedly provided on the end surface 32 in a manner to oppose to each other: at a spacing slightly larger than the width dimension between the cut-out surfaces 24, 24 provided at the large diameter portion 22 of the nozzle 20 (see FIG. 6A); and at a height not exceeding the thickness of the large diameter portion 22; thereby making it possible to to determine the phase of the nozzle 20 by assembling the cut-out surfaces 24, 24 of the nozzle 20 into a position between the positioning means 31, 31 matchingly thereto, respectively. As shown in FIG. 7, FIG. 8A through FIG. 8C, the cylindrical member 51a of the second embodiment includes setscrews 56a, 56a, and the cylindrical member is fitted on the nozzle holder 30a and fastened to the neck 33 by the setscrews 56a, 56a so that the cylindrical member is integrally fixed to the nozzle holder 30a.

Provided at the outer peripheral portion of the nozzle holder 30 (in case of the second embodiment, at the outer peripheral portion of the cylindrical member 51a) are the grooves 52, 53, 54 and 52, 53, 54 (see FIG. 3, FIG. 5, FIG. 7, FIG. 8A through FIG. 8C) to be engaged with the nozzle attachment/detachment moving portions 50, 50 to be described later, in a manner to be engaged with and interacted with the nozzle attachment/detachment moving portions 50, thereby making it possible to to attach and detach the nozzle 20 to and from the nozzle holder 30 (30a).

The grooves 52, 53, 54 and 52, 53, 54 are substantially symmetrically provided at pertinent depths of the outer peripheral portion of the nozzle holder 30 or cylindrical member 51a, as two continuous helical grooves each having a length shorter than the circumference of the outer peripheral portion in a manner to obtain a desired travel distance such as when each helical groove is traveled by 90 degrees in a right-hand screw direction. Further, each groove 52 has distal ends provided with the grooves 53, 54 having no helical angles over an appropriate range, respectively. Provided at the distal end portions of the grooves 53, 54 are recesses 57, 57 and 58, 58 each dug into an appropriate depth deeper than the grooves 53, 54, such that the associated recess 57 and recess 58 are interconnected by the groove 52 having the grooves 53, 54 having no helical angles, respectively. There are further provided axial grooves (hereinafter called "vertical grooves") 59, 59 communicated with the recesses 57, 57 acting as the starting points of the right-hand screw direction, respectively, and the end portions of the vertical grooves 59 in the direction separated from the recesses 57 are formed to become continuously deeper. The vertical grooves 59, 59 act as guiding paths for the nozzle attachment/detachment moving portions 50, 50 upon attaching the nozzle fixing member 40 to the nozzle holder 30 (in the second embodiment, to the cylindrical member 51a), respectively.

The nozzle fixing member 40 includes: an opening portion 41 opened into an elongated hole shape and opposed to the end surface 32, such that the nozzle 20 can be inserted into the opening portion 41 from the large diameter portion 22; and projected portions 43, 43 projected from an outer peripheral portion 42 so as to act as handhold portions, respectively. The opening portion 41 is provided at a central position of that portion of the nozzle fixing member 40 which opposes to the end surface 32 of the nozzle holder 30 (30a) when the nozzle fixing member 40 is attached to the nozzle holder 30 (in the second embodiment, to the cylindrical member 51a). The phase relationship among the positioning means 31, 31, the opening portion 41 of nozzle fixing member 40, the nozzle attachment/detachment moving portions 50, 50, and the grooves 52, 53, 54 and 52, 53, 54 is settled such that the major axis of the opening portion 41 becomes perpendicular to the opposing direction between the positioning means 31, 31 when the nozzle attachment/detachment moving portions 50, 50 are placed in the recesses 57, 57, respectively, and such that the cut-out surfaces 24, 24 of the nozzle 20 are inserted between the positioning means 31, 31 to thereby determine the phase at issue when the large diameter portion 22 of the nozzle 20 is inserted into the opening portion 41 in the aforementioned perpendicular state. Thus, the phase of the nozzle 20 inserted through the opening portion 41 is determined by the positioning means 31, 31 provided at the nozzle holder 30 (30a). After inserting the nozzle 20 into the opening portion 41, the nozzle fixing member 40 is to be manually rotated around the nozzle holder 30 (in the second embodiment, around the cylindrical member 51a integral with the nozzle holder 30a) in a direction where the nozzle attachment/detachment moving portions 50, 50 move along the grooves 52, 52, i.e., in the clockwise direction. As a result, the nozzle fixing member 40 is moved in the axial direction of the nozzle holder 30 (30a), and the edge portions passed through by the minor axis of the opening portion 41 in the elongated hole shape are covered onto the portions of the large diameter portion 22 which are not cut out, so that the large diameter portion 22 is seized by a lower surface 45 of the edge portions passed through by the minor axis to thereby fix the nozzle 20. To release the nozzle 20, there is conducted the reverse operation. Further, the nozzle attachment/detachment moving portions 50, 50 are movable through the vertical grooves 59, 59, so that the nozzle fixing member 40 is removable relative to the nozzle holder 30 (in the second embodiment, relative to the cylindrical member 51a integral with the nozzle holder 30a).

As shown in FIG. 3, the nozzle attachment/detachment moving portions 50, 50 are provided to establish protruded bodies at the inner peripheral portion of the nozzle fixing member 40, at one sides of engagement adjusting members 55, 55 insertedly provided in the projected portions 43, 43 projected as handhold portions from the outer peripheral portion 42 of the nozzle fixing member 40. In detail, the nozzle attachment/detachment moving portions 50, 50 are spherical bodies to be pushed out by spring-like elastic bodies (not shown) provided inside the engagement adjusting members 55, 55 formed as threaded rod bodies, such that portions of the spherical bodies are pushed out from the threaded rod bodies by appropriate forces to thereby contact the nozzle attachment/detachment moving portions 50 with the associated grooves 52 by appropriate forces, respectively. The nozzle attachment/detachment moving portion 50 is pushed back by the bottom surface of the groove 52 when the nozzle attachment/detachment moving portions 50 is midway along the groove 52, while the nozzle attachment/detachment moving portion 50 falls into the recess 57 and recess 58 provided at the distal end portions of the groove 52 when the nozzle attachment/detachment moving portion 50 is at such distal end portions, respectively, thereby assuredly holding the nozzle attachment/detachment moving portion 50 at such positions, respectively. Note, it is possible to attach the nozzle fixing member 40 to the nozzle holder 30 (30a) even without providing the vertical grooves 59, 59. In this case, it is possible to constitute such that the nozzle fixing member 40 is fitted onto the nozzle holder 30 (in the second embodiment, onto the cylindrical member 51a) and then the engagement adjusting members 55, 55 are mounted into the projected portions 43, 43 of the nozzle fixing member 40, respectively, in a manner to be engaged with any of grooves 52, 52 or 53, 53 or 54, 54.

Figure 9:
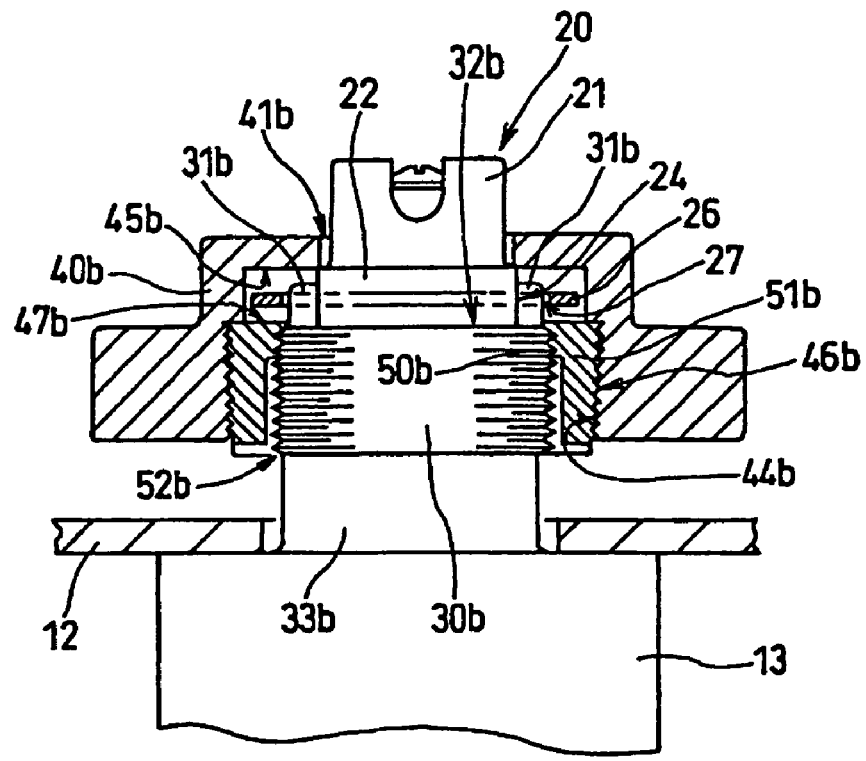
FIG. 9 is a partial cross-sectional view of a dampening water spraying device according to a third embodiment of the present invention.
Figure 10:
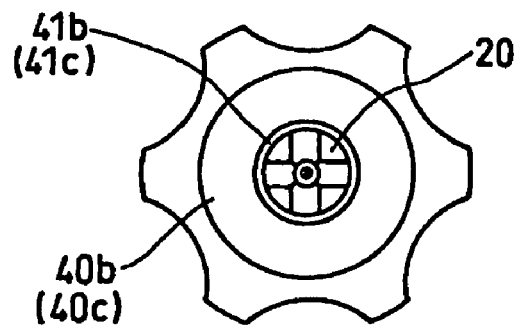
FIG. 10 is a partial plan view of FIG. 9 and FIG. 12.
Figure 11:
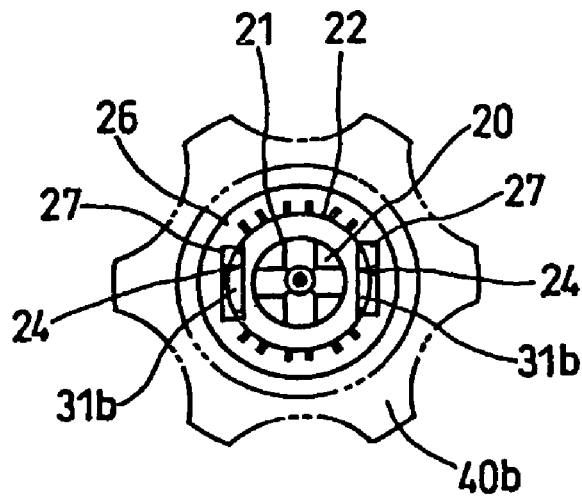
FIG. 11 is a partial plan view showing a relationship between the nozzle provided with a separation preventing member of FIG. 9 and positioning means.

The spraying device 11b as the third embodiment of the present invention will be now shown in FIG. 9 through FIG. 11. The spraying device 11b of the third embodiment is constituted to include: a nozzle 20 for spraying dampening water; a nozzle holder 30b, which is integrally attached to one end side of the electromagnetic opening/closing valve 13, which includes positioning means 31b, 31b for the nozzle 20, and which includes an outer peripheral portion provided with a male screw 52b; a nozzle fixing member 40b including an inner peripheral portion provided with a female screw 44b for fixing the nozzle 20 to the nozzle holder 30b; and a nozzle attachment/detachment moving portion 50b including a cylindrical member 51b having an inner peripheral portion formed with a female screw to be engaged with the male screw 52b of the nozzle holder 30b. There will be explained hereinafter the constitutions of the respective portions.

Figure 6C:
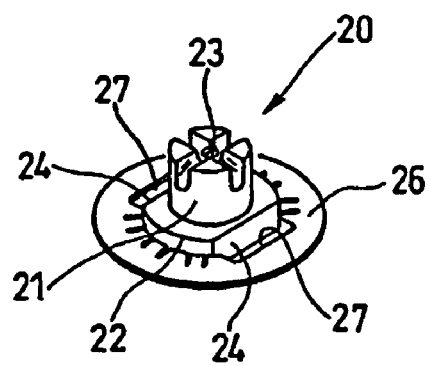
FIG. 6C is a perspective view of a separation preventing member provided at the large diameter portion of the nozzle in FIG. 6A.

As shown in FIG. 6B, FIG. 6C, the nozzle 20 includes a small diameter portion 21 and a large diameter portion 22, and the small diameter portion 21 is provided with an orifice 23 for spraying dampening water. The large diameter portion 22 is provided with cut-out surfaces 24, 24 established by partly removing the large diameter portion so as to provide a width larger than the diameter of the small diameter portion 21, and the large diameter portion 22 includes a lower surface 28 provided with an O-ring 25. When the nozzle 20 is attached to the nozzle holder 30b (FIG. 9), the lower surface 28 of the large diameter portion 22 is closely contacted with a connecting portion of an end surface 32b of the nozzle holder 30b by virtue of elastic deformation of the O-ring 25. The nozzle 20 is provided with a separation preventing member 26 for allowing movement of the nozzle and for preventing separation of the nozzle from the nozzle fixing member 40b when the nozzle 20 is incorporated into the nozzle fixing member 40b. As shown in FIG. 6C, the separation preventing member 26 is attached to the outer peripheral portion of the large diameter portion 22, such that cut-outs 27, 27 of the separation preventing member 26 are correspondingly matched with the cut-out surfaces 24, 24 of the large diameter portion 22 of the nozzle 20, respectively. As shown in FIG. 11, the separation preventing member 26 is provided with the cut-outs 27, 27 (FIG. 6C) such that the separation preventing member 26 never interferes with the positioning means 31*b*, 31*b*, when the cut-out surfaces 24, 24 of the nozzle 20 are inserted between the positioning means 31*b*, 31*b* provided at the end surface 32*b* to thereby determine the connecting phase of the nozzle 20. As further shown in FIG. 9, the nozzle 20 is not to be separated from the nozzle fixing member 40*b* in a state where the nozzle 20 is attached into an opening portion 41*b* of the nozzle fixing member 40*b* to be described later, even when the nozzle fixing member 40*b* together with the nozzle 20 is detached from the nozzle holder 30*b*.

As shown in FIG. 9, the nozzle holder 30*b* is provided with a neck 33*b* integrated with the electromagnetic opening/closing valve 13, and includes the male screw 52*b* and the positioning means 31*b*, 31*b*, the latter being provided at the end surface 32*b* so as to determine the connecting phase of the nozzle 20. Since the positioning means 31*b*, 31*b* are the same as the positioning means 31, 31 in the first embodiment, the explanation of the former shall be omitted. The outer peripheral portion of the nozzle holder 30 is formed with the male screw 52*b* to be engaged with the nozzle attachment/detachment moving portion 50*b* to be described later, in a manner to engage and interact with the nozzle attachment/detachment moving portion 50*b* as the female screw formed at the inner peripheral portion of the cylindrical member 51*b* integral with the nozzle fixing member 40*b*, thereby allowing to attach and detach the nozzle 20 to and from the nozzle holder 30.

The nozzle fixing member 40*b* includes an outer peripheral portion provided with handhold portions for making it possible to to manually rotate the nozzle fixing member 40*b*. As shown in FIG. 9, FIG. 10, at the central portion of that portion of the nozzle fixing member 40*b* which opposes to the end surface 32*b* of the nozzle holder 30*b* when the nozzle fixing member 40*b* is attached to the nozzle holder 30*b*, the nozzle fixing member 40*b* includes a circular opening portion 41*b* into which the nozzle 20 can be inserted, while the female screw 44*b* provided at the inner peripheral portion of the nozzle fixing member 40*b* is threaded with a male screw 46*b* of the cylindrical member 51*b* to thereby integrally fix the cylindrical member 51*b*. Provided between, a lower surface 45*b* of those edge portion of the opening portion 41*b* which contact with the upper surface of the large diameter portion 22 of the nozzle 20, and an end surface 47*b* of the threadedly inserted cylindrical member 51*b*, is an appropriate clearance for allowing to accommodate therein the separation preventing member 26 of the nozzle 20. The inner peripheral portion of the cylindrical member 51*b* integral with the nozzle fixing member 40*b* is provided with the nozzle attachment/detachment moving portion 50*b* formed with the female screw for obtaining a desired travel distance required to fix the nozzle 20. The nozzle 20, which is inserted into the opening portion 41*b* of the nozzle fixing member 40*b* and the phase of which nozzle is determined relative to the nozzle holder 30*b*, is fixed to the nozzle holder 30*b* by manually rotating the nozzle fixing member 40*b* clockwise so that the lower surface 45*b* at the edge portion of the opening portion 41*b* seizes the upper surface of the large diameter portion 22 of the nozzle 20.

Figure 12:
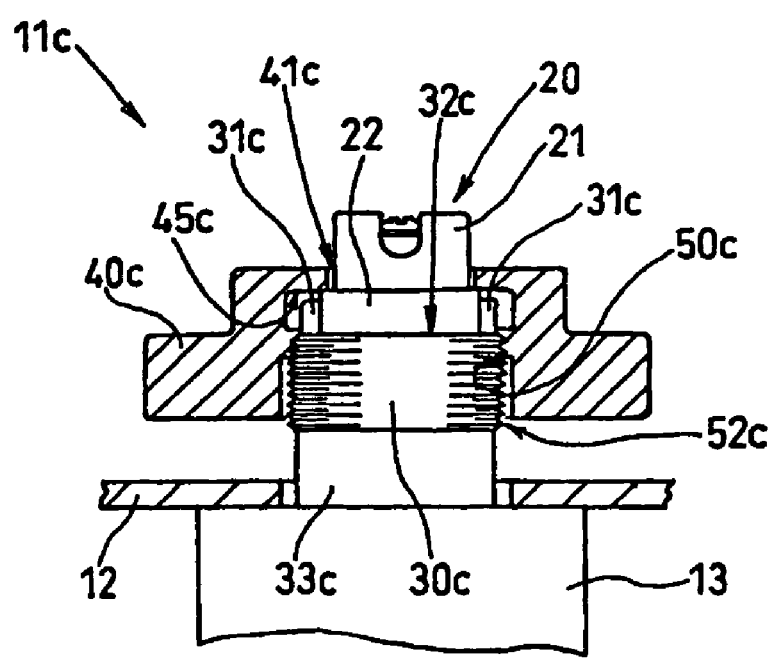
FIG. 12 is a partial cross-sectional view of a dampening water spraying device according to a fourth embodiment is a front of a present invention.

Next, FIG. 10, FIG. 12 show a fourth embodiment of a spraying device according to the present invention. The spraying device 11*c* of the fourth embodiment is constituted to include: a nozzle 20 for spraying dampening water; a nozzle holder 30*c*, which is integrally attached to one end side of the electromagnetic opening/closing valve 13, which includes positioning means 31*c*, 31*c* for the nozzle 20, and which includes an outer peripheral portion provided with a male screw 52*c*; a nozzle fixing member 40*c* for fixing the nozzle 20 to the nozzle holder 30*c*; and a nozzle attachment/detachment moving portion 50*c* provided at an inner peripheral portion of the nozzle fixing member 40*c* and formed with a female screw to be engaged with the male screw 52*c* of the nozzle holder 30*c*. There will be explained hereinafter the constitutions of the respective portions.

The nozzle 20 is the same as that in the first embodiment shown in FIG. 6A, FIG. 6B, and the explanation of the former shall be omitted.

As shown in FIG. 12, the nozzle holder 30*c* is provided with a neck 33*c* integrated with the electromagnetic opening/closing valve 13, and includes an end surface 32*c* provided with positioning means 31*c*, 31*c* for determining the connecting phase of the nozzle 20. The positioning means 31*c*, 31*c* are the same as the positioning means 31, 31 of the first embodiment and second embodiment, so that the explanation of the former shall be omitted. The nozzle holder 30*c* includes an outer peripheral portion provided with the male screw 52*c* to be engaged with the nozzle attachment/detachment moving portion 50*c* to be described later, in a manner to engage and interact with the nozzle attachment/detachment moving portion 50*c* as the female screw formed at the inner peripheral portion of the nozzle fixing member 40*c*, thereby making it possible to to attach and detach the nozzle 20 to and from the nozzle holder 30*c*.

The nozzle fixing member 40*c* includes an outer peripheral portion provided with handhold portions for making it possible to to manually rotate the nozzle fixing member 40*c*. As shown in FIG. 10, FIG. 12, at the central portion of that portion of the nozzle fixing member 40*c* which opposes to the end surface 32*c* of the nozzle holder 30*c* when the nozzle fixing member 40*c* is attached to the nozzle holder 30*c*, the nozzle fixing member 40*c* includes a circular opening portion 41*c* into which the nozzle 20 can be inserted, and the nozzle fixing member 40*c* includes an inner peripheral portion provided with the nozzle attachment/detachment moving portion 50*c* formed with a female screw for allowing to obtain a desired travel distance required to fix the nozzle 20. The nozzle 20, which is inserted into the opening portion 41*c* of the nozzle fixing member 40*c* and the phase of which nozzle is determined relative to the nozzle holder 30*c*, is fixed to the nozzle holder 30*c* by manually rotating the nozzle fixing member 40*c* clockwise so that the lower surface 45*c* at the edge portion of the opening portion 41*c* seizes the upper surface of the large diameter portion 22 of the nozzle 20.

There will be explained hereinafter an operation of the dampening water spraying device according to the present invention, with reference to the drawings. Since the first embodiment according to the present invention is the same as the second embodiment except that the nozzle holder 30 is not mounted with the cylindrical member in the first embodiment, the second embodiment will be explained by simultaneously describing the same in brackets. In the second embodiment as shown in FIG. 7, the cylindrical member 51*a* is to be previously and integrally assembled to the nozzle holder 30*a*, by fitting the cylindrical member 51*a* onto the nozzle holder 30*a* and by fastening the cylindrical member 51*a* to the neck 33 by the setscrews 56*a*, 56*a*. Now in the first embodiment (second embodiment) as shown in FIG. 3 through FIG. 5 (shown in FIG. 7), in order to attach the nozzle fixing member 40 to the nozzle holder 30 (30*a*), the nozzle attachment/detachment moving portions 50, 50 protruded from the inner peripheral portion of the nozzle fixing member 40 to thereby form the protruded bodies are pushed into the axial direction matchedly with the vertical grooves 59, 59 provided in the axial direction of the nozzle holder 30 (in the second embodiment, of the cylindrical member 51a integral with the nozzle holder 30a). The entrances of the vertical grooves 59, 59 are dug deeply, thereby making it possible to to readily insert the nozzle fixing member 40. As the nozzle attachment/detachment moving portions 50, 50 are pushed in the axial direction, the vertical grooves 59, 59 become shallower and finally reach a constant depth. The nozzle attachment/detachment moving portions 50, 50 are outwardly pushed back against the elastic bodies of the engagement adjusting members 55, 55 constituting the threaded rod bodies provided in the nozzle fixing member 40, and instantly fall into the recesses 57, 57 upon reaching the terminating ends of the vertical grooves 59, 59, respectively. This completes the fitting of the nozzle fixing member 40, and the positions of the recesses 57, 57 define the starting position of the nozzle fixing member 40 for starting the fixing of the nozzle 20. In this state, the nozzle 20 can be inserted between the positioning means 31, 31 projectedly provided at the end surface 32, by inserting the large diameter portion 22 of the nozzle 20 through the opening portion 41.

In attaching the nozzle 20 to the nozzle holder 30 (30a), the nozzle 20 is inserted through the opening portion 41, and the phase of the nozzle 20 is determined by assembling the cut-out surfaces 24, 24 of the nozzle 20 into a position between the positioning means 31, 31 matchingly thereto, respectively. Next, the nozzle fixing member 40 is manually rotated clockwise. This causes the nozzle attachment/detachment moving portions 50, 50 to move from the grooves 53, 53 without helical angles, through helical grooves 52, 52, to the grooves 54, 54 without helical angles, so that the nozzle fixing member 40 moves axially while rotating. Namely, the nozzle attachment/detachment moving portions 50, 50 pass along the helical grooves 52, 52 and reach terminating ends of the grooves 54, 54, and then fall into the recesses 58, 58, respectively. In the process of the above, the upper surface side of the large diameter portion 22 of the nozzle 20 comes to be urged by the lower surface 45 of the edge portions passed through by the minor axis of the opening portion 41 of the nozzle fixing member 40, and the nozzle attachment/detachment moving portions 50, 50 fall into the recesses 58, 58 upon reaching the terminating ends. The positions of the recesses 58, 58 define the ending position of the nozzle fixing member 40, i.e., the attachment completing position of the nozzle 20. At this time, the nozzle 20 is completely closely contacted with and fixed to the end surface 32 of the nozzle holder 30 (30a), by virtue of the elastic deformation of the O-ring 25 provided at the lower surface 28 of the large diameter portion 22. This first embodiment (second embodiment) is provided with the grooves 52, 53, 54 and 52, 53, 54 for allowing to obtain a desired travel distance by a turn of 90 degrees around the axis, thereby making it possible to to swiftly fix the nozzle 20 in a so-called one-touch manner.

In detaching the nozzle 20 from the nozzle holder 30 (30a), the nozzle fixing member 40 is rotated in the opposite direction, i.e., from the ending position toward the starting position to thereby release the seizure of the large diameter portion 22 of the nozzle 20, and the nozzle 20 can be then readily detached from the nozzle holder 30 (30a) by picking up the small diameter portion 21 of the nozzle 20 while placing the nozzle fixing member 40 at the starting position. Further, upon cleaning, the nozzle fixing member 40 is drawn out along the vertical grooves 59, 59, thereby making it possible to to detach the nozzle fixing member 40.

Next, in the third embodiment according to the present invention shown in FIG. 9 through FIG. 11, the nozzle 20 provided with the separation preventing member 26 is incorporated into the nozzle fixing member 40b such that the movement of the nozzle 20 is allowed but the separation thereof is prevented by virtue of the cylindrical member 51b, and the nozzle 20 is rotatable relative to the opening portion 41b. In attaching the nozzle 20 to the nozzle holder 30b, the inner peripheral portion of the cylindrical member 51b integral with the nozzle fixing member 40b is threaded onto the nozzle holder 30b, and then the tip end of the nozzle 20 is lightly pinched and rotated rightwardly or leftwardly to thereby assemble the cut-out surfaces 24, 24 of the nozzle 20 into a position between the positioning means 31, 31 matchingly thereto, respectively, so that the positioning means 31b, 31b are inserted into the cut-outs 27 of the separation preventing member 26, respectively, thereby determining the phase of the nozzle 20. Next, the nozzle fixing member 40b is manually rotated clockwise until the same stops. Thus, the nozzle fixing member 40b is moved in the axial direction by the nozzle attachment/detachment moving portion 50b engaged with the male screw 52b of the nozzle holder 30b, so that the upper surface side of the large diameter portion 22 of the nozzle 20 comes to be pushed by the lower surface 45b of the edge portions of the opening portion 41b of the nozzle fixing member 40b, thereby obtaining a desired travel distance of the nozzle fixing member 40b such as by an approximately 1.5 turns, to thereby fix the nozzle 20. In detaching the nozzle 20, the nozzle fixing member is rotated in the opposite direction to thereby release the engagement of the nozzle attachment/detachment moving portion 50b with the male screw 52b of the nozzle holder 30b, thereby making it possible to to detach the nozzle fixing member 40b together with the nozzle 20.

In replacing the nozzle 20, the cylindrical member 51b is detached from the nozzle fixing member 40b so as to remove the used nozzle and to insert a new nozzle provided with a separation preventing member 26 into the opening portion 41b, and then the cylindrical member 51b is again threaded into the nozzle fixing member 40b.

In case of the fourth embodiment according to the present invention as shown in FIG. 10 through FIG. 12, the phase of the nozzle 20 is previously determined by assembling the cut-out surfaces 24, 24 of the nozzle 20 into a position between the positioning means 31, 31 of the nozzle holder 30c matchingly thereto, respectively. Then, the inner peripheral portion of the nozzle fixing member 40c is fitted onto the nozzle holder 30c such that the nozzle 20 is inserted into the opening portion 41c. Next, the nozzle fixing member 40c is manually rotated clockwise until the same stops. Thus, the nozzle fixing member 40c is moved in the axial direction by the nozzle attachment/detachment moving portion 50c engaged with the male screw 52c of the nozzle holder 30c, so that the upper surface side of the large diameter portion 22 of the nozzle 20 comes to be pushed by the lower surface 45c of the edge portions of the opening portion 41c of the nozzle fixing member 40c, thereby obtaining a desired travel distance of the nozzle fixing member 40c such as by an approximately 1.5 turns, to thereby fix the nozzle 20. In detaching the nozzle 20, the nozzle fixing member is rotated in the opposite direction to thereby release the engagement of the nozzle attachment/detachment moving portion 50c with the male screw 52c of the nozzle holder 30c, thereby making it possible to to detach the nozzle fixing member 40c attached with the nozzle 20 from the nozzle holder 30c. Thereafter, the nozzle 20 left on the nozzle holder 30c is removed.

Figure 1:
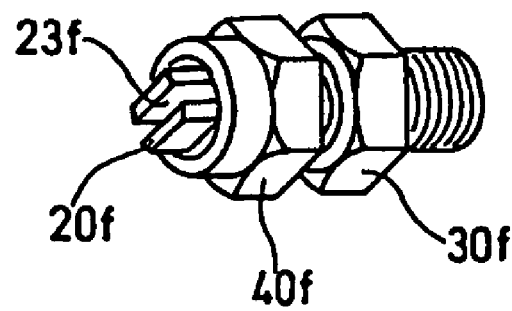
FIG. 1 is a partial perspective view of a spraying device of the prior art.
Figure 2:
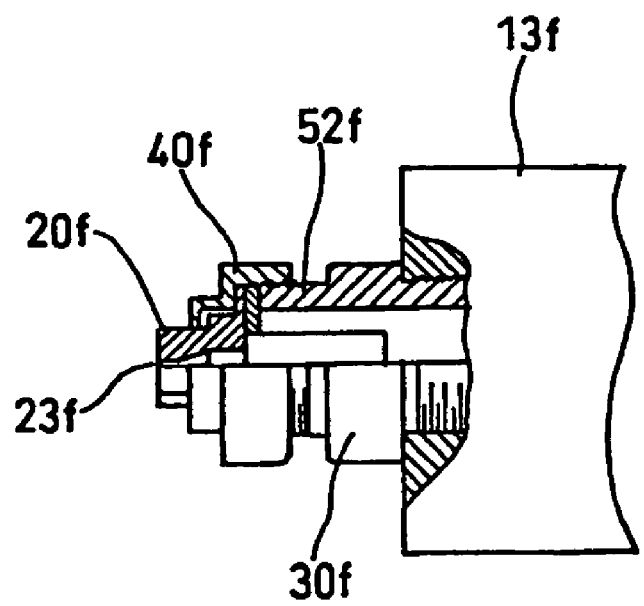
FIG. 2 is a partial cross-sectional view of the spraying device of FIG. 1.

According to the embodiments of the spraying device of the present invention as described above, it is of course possible to adapt to various spraying devices even including the nozzle holder 52f of the prior art such as shown in FIG. 1, FIG. 2, by utilizing the constitution including either of the cylindrical member 51a and 51b in the second embodiment and third embodiment, respectively, in a manner to form a cylindrical member corresponding to an applicable nozzle holder.

It is also possible that the outer peripheral portion of the cylindrical member 51a shown in the second embodiment and the outer peripheral portion of the nozzle holder 30 shown in the first embodiment are provided with the nozzle attachment/detachment moving portions 50, respectively, and that the inner peripheral portions of the associated nozzle fixing members 40 are provided with the corresponding grooves, in a manner opposite to: the relationship of the nozzle attachment/detachment moving portions 50 constituting the protruded bodies from the inner peripheral portion of the nozzle fixing member 40, relative to the grooves 52, 53, 54 and recesses 57, 58 at the outer peripheral portion of the cylindrical member 51a; and the relationship of the nozzle attachment/detachment moving portions 50 constituting the protruded bodies from the inner peripheral portion of the nozzle fixing member 40, relative to the grooves 52, 53, 54 and the recesses 57, 58 at the outer peripheral portion of the nozzle holder 30.

According to the present invention as described above, it becomes possible to readily and manually attach and detach the nozzle without using any mounting tools, thereby contributing to mitigating a work burden of a responsible person.

Further, since the maintenance of nozzles are facilitated by virtue of the mitigated burden of a replacing work, it becomes possible to properly manage and stabilize the spraying state of dampening water, thereby making it possible to to maintain and improve a printing quality.

According to the inventions recited in claims 8, 9 and 10, it becomes possible to mitigate a work burden of a responsible person even in the spraying device of the prior art having a screw portion on a nozzle holder, and to facilitate the maintenance of the nozzle.

What is claimed is:

1. A dampening water spraying device for a dampening arrangement for spraying dampening water from a nozzle onto a printing plate surface or onto a peripheral surface of a roller leading to the printing plate, the spraying device comprising:
    a nozzle for spraying dampening water;
    a nozzle holder including, an end surface connectable to said nozzle, and an outer peripheral portion provided with at least one groove; and
    a nozzle fixing member including, an opening portion adapted to expose at least a spout of said nozzle, and an inner peripheral portion provided with an adjustable nozzle attachment/detachment moving portion opposed to and engageable with said groove, said nozzle fixing member being adapted to be fastened to said nozzle holder while clamping said nozzle between said nozzle fixing member and said nozzle holder;
    wherein said nozzle fixing member includes an outer peripheral portion provided with a handhold portion for making it possible to manually rotate said nozzle fixing member; and
    wherein said nozzle fixing member is capable of fixing said nozzle to said nozzle holder by manually rotating said nozzle fixing member in one direction relative to said nozzle holder, and is capable of detaching said nozzle from said nozzle holder by manually rotating said nozzle fixing member in the other direction relative to said nozzle holder.

2. A dampening water spraying device for a dampening arrangement for spraying dampening water from a nozzle onto a printing plate surface or onto a peripheral surface of a roller leading to the printing plate, the spraying device comprising:
    a nozzle for spraying dampening water;
    a nozzle holder including, an end surface connectable to said nozzle, and an outer peripheral portion having at least one adjustable nozzle attachment/detachment moving portion; and
    a nozzle fixing member including, an opening portion adapted to expose at least a spout of said nozzle, and an inner peripheral portion provided with a groove opposed to and engageable with said nozzle attachment/detachment moving portion, said nozzle fixing member being adapted to be fastened to said nozzle holder while clamping said nozzle between said nozzle fixing member and said nozzle holder;
    wherein said nozzle fixing member includes an outer peripheral portion provided with a handhold portion for making it possible to manually rotate said nozzle fixing member; and
    wherein said nozzle fixing member is capable of fixing said nozzle to said nozzle holder by manually rotating said nozzle fixing member in one direction relative to said nozzle holder, and is capable of detaching said nozzle from said nozzle holder by manually rotating said nozzle fixing member in the other direction relative to said nozzle holder.

3. The dampening water spraying device of claim 1 or 2, wherein said nozzle attachment/detachment moving portion is a protruded body, and
    wherein said groove to be engaged with said nozzle attachment/detachment moving portion is a helical groove shorter than the circumference of a peripheral portion to be provided with said helical groove.

4. The dampening water spraying device of claim 1 or 2, wherein said nozzle attachment/detachment moving portion and said groove to be engaged with said nozzle attachment/detachment moving portion are threaded members, respectively.

5. The dampening water spraying device of claim 1 or 2, wherein said opening portion of said nozzle fixing member has a shape formed to enable said nozzle to pass through said opening portion when said opening portion and said nozzle are placed in a predetermined phase relationship.

6. The dampening water spraying device of claim 1 or 2, wherein said nozzle is incorporated in said nozzle fixing member in a manner to be allowed to move relative to said nozzle fixing member, and to be prevented from separating from said nozzle fixing member.

7. The dampening water spraying device of claim 1 or 2, wherein said outer peripheral portion of said nozzle holder comprises a cylindrical member provided integrally with said nozzle holder.

8. The dampening water spraying device of claim 1 or 2, wherein said inner peripheral portion of said nozzle fixing member comprises a cylindrical member provided integrally with said nozzle fixing member.

9. The dampening water spraying device of claim 1 or 2, wherein said handhold portion comprises at least one projected portion projected from said outer peripheral portion of said nozzle fixing member.

10. A dampening water spraying device for a dampening arrangement for spraying dampening water from a nozzle onto a printing plate surface or onto a peripheral surface of a roller leading to the printing plate, the spraying device comprising:
   a nozzle for spraying dampening water;
   a nozzle holder including, an end surface connectable to said nozzle, and an outer peripheral portion provided with at least one groove;
   a nozzle fixing member including, an opening portion adapted to expose at least a spout of said nozzle, and an inner peripheral portion provided with a nozzle attachment/detachment moving portion opposed to and engageable with said groove, said nozzle fixing member being adapted to be fastened to said nozzle holder while clamping said nozzle between said nozzle fixing member and said nozzle holder; and
   positioning means capable of fixingly restricting an attached relationship of said nozzle relative to said nozzle holder;
   wherein said nozzle fixing member includes an outer peripheral portion provided with a handhold portion for making it possible to manually rotate said nozzle fixing member; and
   wherein said nozzle fixing member is capable of fixing said nozzle to said nozzle holder by manually rotating said nozzle fixing member in one direction relative to said nozzle holder, and is capable of detaching said nozzle from said nozzle holder by manually rotating said nozzle fixing member in the other direction relative to said nozzle holder.

11. A dampening water spraying device for a dampening arrangement for spraying dampening water from a nozzle onto a printing plate surface or onto a peripheral surface of a roller leading to the printing plate, the spraying device comprising:
   a nozzle for spraying dampening water;
   a nozzle holder including, an end surface connectable to said nozzle, and an outer peripheral portion having at least one nozzle attachment/detachment moving portion;
   a nozzle fixing member including, an opening portion adapted to expose at least a spout of said nozzle, and an inner peripheral portion provided with a groove opposed to and engageable with said nozzle attachment/detachment moving portion, said nozzle fixing member being adapted to be fastened to said nozzle holder while clamping said nozzle between said nozzle fixing member and said nozzle holder; and
   positioning means capable of fixingly restricting an attached relationship of said nozzle relative to said nozzle holder;
   wherein said nozzle fixing member includes an outer peripheral portion provided with a handhold portion for making it possible to manually rotate said nozzle fixing member; and
   wherein said nozzle fixing member is capable of fixing said nozzle to said nozzle holder by manually rotating said nozzle fixing member in one direction relative to said nozzle holder, and is capable of detaching said nozzle from said nozzle holder by manually rotating said nozzle fixing member in the other direction relative to said nozzle holder.

\* \* \* \* \*